United States Patent
Gislon

(10) Patent No.: US 11,138,353 B2
(45) Date of Patent: Oct. 5, 2021

(54) METHOD FOR DESIGNING DIES FOR DIE CASTING AND DIE

(71) Applicant: COSTAMP GROUP S.P.A., Sirone (IT)

(72) Inventor: Claudio Gislon, Lissone (IT)

(73) Assignee: COSTAMP GROUP S.P.A.

( * ) Notice: Subject to any disclaimer, the term of this patent is extended or adjusted under 35 U.S.C. 154(b) by 13 days.

(21) Appl. No.: 16/633,250

(22) PCT Filed: Jul. 26, 2017

(86) PCT No.: PCT/IT2017/000157
§ 371 (c)(1),
(2) Date: Jan. 23, 2020

(87) PCT Pub. No.: WO2019/021323
PCT Pub. Date: Jan. 31, 2019

(65) Prior Publication Data
US 2020/0175214 A1 Jun. 4, 2020

(51) Int. Cl.
*B22D 17/22* (2006.01)
*G06F 30/23* (2020.01)

(52) U.S. Cl.
CPC ............. *G06F 30/23* (2020.01); *B22D 17/22* (2013.01)

(58) Field of Classification Search
CPC ................................ B22D 17/22; G06F 30/23
See application file for complete search history.

(56) References Cited

U.S. PATENT DOCUMENTS

| | | | |
|---|---|---|---|
| 6,993,463 B1* | 1/2006 | Ewsuk | G06F 30/23 703/2 |
| 2005/0082706 A1* | 4/2005 | Nagaoka | B29C 33/3835 264/40.1 |
| 2016/0039000 A1* | 2/2016 | Chow | B22D 17/263 164/303 |

OTHER PUBLICATIONS

Flow-3D, "HPDC Webinar Series Part III—Solidification & Cooling," https://www.youtube.com/watch?v=QfCeYoRPPYk (Year: 2017).*

* cited by examiner

*Primary Examiner* — Kevin E Yoon
(74) *Attorney, Agent, or Firm* — Mark Malek; Widerman Malek, PL

(57) ABSTRACT

A method for making dies for die casting, and relative die, includes designing moulding parts of the die as plurality of sub-inserts. Each sub-insert of the plurality is bordered by boundary lines defined on the basis of a simulation of thermo mechanical behaviour of the die in operation. The simulation is performed by a processor of a computer and the behaviour is the behaviour of the die if the die were a single piece. The method also includes producing the plurality of sub-inserts and assembling the sub-inserts of the plurality with attachment means, so as to form the die.

14 Claims, 2 Drawing Sheets

METHOD FOR DESIGNING DIES FOR DIE CASTING AND DIE

RELATED APPLICATIONS

This application is a national phase application of and claims priority under 35 U.S.C. § 371 of PCT IT Patent Application Serial No. PCT/IT2017/000157 filed on Jul. 26, 2017 and titled METHOD FOR DESIGNING DIES FOR DIE CASTING AND DIE. The content of this application is incorporated herein by reference.

FIELD OF THE INVENTION

The present invention relates to a method for making dies for the production of parts by means of die casting, preferably of casts of aluminium and magnesium, as well as a die for die casting constructed with this method.

The field of the art whereto the present invention relates is, therefore, preferably but not exclusively the automobile one.

BACKGROUND OF THE INVENTION

It is known that, nowadays, the designing of a car is increasingly aimed at the search for methods and materials which minimise the weight of the components of the car without jeopardising its function, safety and useful life cycle. Even if a decrease in the overall weight of the car and, therefore, of all the components is desirable, the greatest challenge is represented by the lightening of the structural components. The weight of the latter can be minimised by means of the use of light metals, such as aluminium, whose sheets however are found to be difficult to machine when complex shapes are to be produced, due to their limited formability. For this reason the technique most used for the production of the structural components of a car is die casting. For this purpose specific dies are produced for every single component and, sometimes, in order to facilitate maintenance thereof, said dies are produced in a fragmented manner. This means that the dies are produced not as a single piece but as a set of sub-inserts, which are then assembled to form the complete die. The dies for die casting have, however, a limited useful life cycle if compared with the costs which the design and production of the dies entails and the impact of the costs of the production equipment on the cost of the part produced is significant in percentage terms. The duration of the dies is, in particular, strongly limited by the phenomena of thermo mechanical fatigue, or thermal fatigue, which the dies encounter during their use. During the die casting, in fact, the surface temperature varies considerably between a maximum, immediately after casting of the molten metal, and a minimum, after lubrication performed on the die to avoid phenomena of sticking during the subsequent cycle. These strong variations in temperature lead to the formation of very thin cracks which, propagating, group together in the zones where there is the greatest concentration of stresses, giving rise to actual fracture lines along which breakage of the die takes place. The need therefore arises to develop methods of production of dies which, without increasing excessively the costs of design and production, allow the useful life cycle thereof to be extended.

The object of the present invention is therefore that of providing a method for making dies for the production of parts by die casting, which allows dies to be obtained with a considerably longer life cycle, preferably equal to about double the life cycle of dies for die casting constructed with traditional techniques.

This object is achieved by the present invention by means of a method which involves the production of a fragmented die, wherein the sub-inserts are designed in such a way that their boundary lines are located in the zones most subject to thermo mechanical fatigue. In this way the die is, so to speak, "fractured" or "fragmented" in advance, right at the lines of fracture through fatigue which would be formed in the whole die. As will be explained in greater detail here below, the providing of the location of the fracture lines takes place via appropriate simulations of the thermal and mechanical behaviour of the die in operation. These simulations are performed using techniques of numerical modelling implemented by appropriate software and carried out by one or more processors of one or more computers. The result of the simulation allows identification of the zones of the die which are most subject to fatigue, and the boundary lines of the sub-inserts are, therefore, appropriately defined at these zones. Hereinafter the term "boundary lines" is understood to mean the perimeter lines of the boundary surfaces of the sub-inserts.

SUMMARY OF THE INVENTION

All this being so, the method of the present invention comprises:
designing the moulding parts of the die as plurality of sub-inserts, each sub-insert of said plurality being bordered by boundary lines defined on the basis of a simulation of the thermo mechanical behaviour of the die in operation, said simulation being performed by a processor of a computer;
producing said plurality of sub-inserts; and
assembling the sub-inserts of said plurality with attachment means so as to form said die For the purposes of the present description the expression "moulding parts" refers here to those parts of the die which come into physical contact with the material injected.

The die that is the object of the present invention is, therefore, obtainable with the method described above and comprises a plurality of sub-inserts, assembled with attachment means and bordered by boundary lines, said boundary lines being located at least partially in the zones of greatest fatigue.

The need to have dies with a high fatigue resistance has led, at the current state of the art, to the development of special alloys with high mechanical and thermal strength. These alloys are, for example, those commonly known by the commercial names of Marlok®, Anviloy®, Rovalma®. The use of materials with such high thermo mechanical performances entails a further increase in costs.

A second object of the present invention is, therefore, that of reducing the costs linked to the use of special alloys. This object is achieved by the method of the present invention in that, thanks to the fragmentation of the die into parts, or sub-inserts, it is possible to use different materials for the different sub-inserts. Since the fragmentation is performed on the basis of the result of the simulation of the thermo mechanical fatigue of the die, it is possible to use the special alloys only for those sub-inserts most stressed from the thermal and mechanical viewpoint and use less resistant and less costly alloys for the other sub-inserts.

These and further objects will be made clearer by the following exemplifying embodiments and by the detailed description of some preferred embodiments of the present invention, to be understood by way of a non-limiting example of the more general concepts claimed.

BRIEF DESCRIPTION OF THE DRAWINGS

The following description refers to the accompanying drawings, in which.

DETAILED DESCRIPTION OF THE INVENTION

Figure 1A:
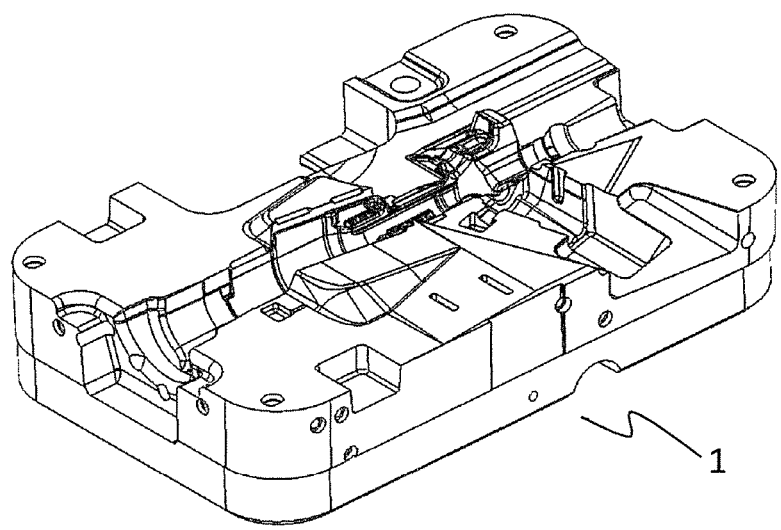
FIG. 1a is a three-dimensional view of a die according to the present invention.
Figure 1B:
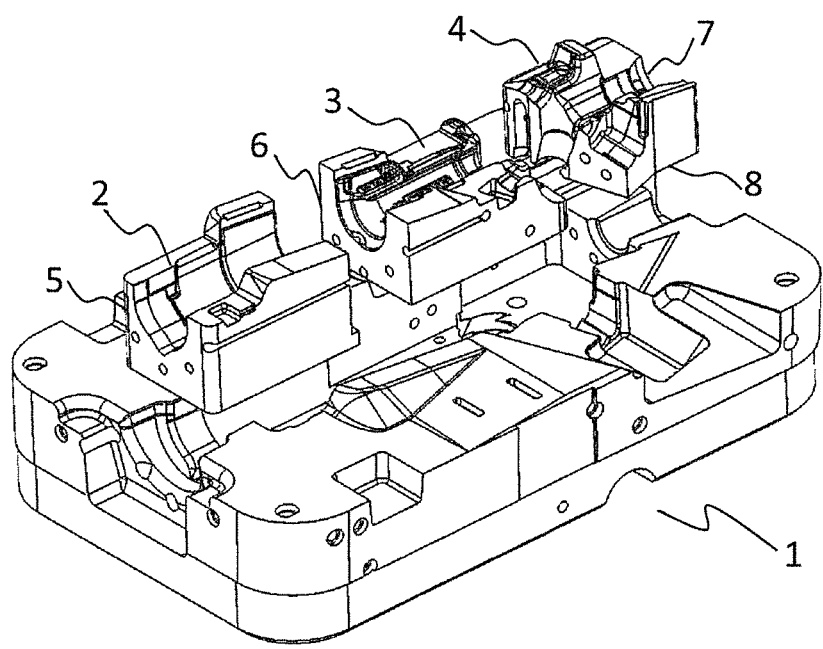
FIG. 1b is a blown-up view of a die according to the present invention.

Referring to FIGS. 1 and 2, the method of the present invention comprises:
  designing the moulding parts of the die (1) as plurality of sub-inserts (2, 3, 4), each sub-insert (2, 3, 4) of said plurality being bordered by boundary lines (5, 6, 7, 8) defined on the basis of a simulation of the thermo mechanical behaviour of the die in operation, said simulation being performed by means of the processor of a computer and said behaviour being the behaviour of the die if said die were a single piece;
  producing said plurality of sub-inserts (2, 3, 4); and
  assembling the sub-inserts (2, 3, 4) of said plurality with attachment means, so as to form said die (1);
  means, so as to form said die (1);
The operation of simulation in turn comprises:
  modelling, by means of a processor of a computer, the thermo mechanical phenomena whereto the die in operation would be subject if said die were whole;
  calculating a spatial distribution of a first index of thermo mechanical fatigue, said first index being higher the smaller the fatigue stress, or strain, or a spatial distribution of a second index of thermo mechanical fatigue, said second index being higher the greater the fatigue stress, or strain;
  identifying on the surface of the die the areas or zones of fatigue, wherein said first index is higher at a first threshold or said second index is lower at a second threshold; and
  defining the boundary lines (5, 6, 7, 8) in such a way that said boundary lines (5, 6, 7, 8) are contained at least partially within the fatigue zones.
The definition of the boundary lines, moreover, provides for:
  identifying of the geometric discontinuities of the die;
  selecting among the geometric discontinuities the discontinuities located in the fatigue zones; and
  defining of the boundary lines at said discontinuities.

The expression "geometric discontinuities" refers, hereinafter, to those lines which define the sharp changes in shape of said object.

The modelling of the thermo mechanical phenomena whereto the die in operation is subject can be performed by means of the application of the finite elements method (FEM) and comprises, in particular, the following steps:
  modelling the geometry of die and of the heat-regulation channels present inside the die;
  discretising of the surface of the die and of the heat-regulation channels by means of a two-dimensional grid, or mesh;
  refining the two-dimensional grid with which the surface of the die has been discretised, at the zones of contact between die and metal used for the die casting;
  discretising of the volume of the die and of the heat-regulation channels by means of a three-dimensional grid, or mesh;
  defining the materials which constitute the die and the materials of the parts to be made by means of die casting;
  defining the mechanical and thermal boundary conditions;
  modelling the thermo mechanical phenomena which involve the die during a die casting cycle;
  calculating a first spatial and temporal distribution of the temperature in the die during a first cycle of die casting.
  calculating a second spatial and temporal distribution of the temperature in the die during a second cycle of die casting;
  comparing of the first spatial and temporal distribution of the temperature with the second spatial and temporal distribution of the temperature;
  calculating of the spatial and temporal distribution of stresses, if the first spatial and temporal distribution of the temperature does not vary more than 2% (supposing the temperature measured in K) with respect to the second spatial and temporal distribution of the temperature;
  calculating of a third spatial and temporal distribution of the temperature in the die, during a third cycle of die casting, if the first spatial and temporal distribution of the temperature does not vary more than 2% (supposing the temperature measured in K) with respect to the second spatial and temporal distribution of the temperature.

If the third spatial and temporal distribution of the temperature does not vary more than 2% (supposing the temperature measured in K) with respect to the second spatial and temporal distribution of the temperature, the calculation ends, otherwise a fourth distribution of the temperature is calculated which, in turn, is compared with the third distribution of the temperature, and so on. Summing up, the calculation ends when stationary conditions are reached, i.e. the spatial and temporal distribution of the temperature in the die during the i-th cycle does not vary more than 2% (supposing the temperature measured in K) with respect to the spatial and temporal distribution of the temperature in the die during the (i+1)-th cycle. More particularly, the typical cycle of die casting comprises:
  solidification of the metal;
  opening of the die;
  extraction of the part;
  air cooling of the die;

spraying/lubrication of the die;
blowing;
closure of the die.

The distribution of the stresses can be obtained by means of the calculation of the so-called "effective stress" or "$\sigma_{effective}$". The latter is given by the following equation:

$$\sigma_{effective} = \sqrt{\frac{3}{2}(\sigma_I - \sigma_{II})^2 + (\sigma_{II} - \sigma_{III})^2 + (\sigma_{III} - \sigma_I)^2}$$

where $\sigma_I$, $\sigma_{II}$, $\sigma_{III}$, are the main stresses, i.e. the auto values of the matrix which constitutes the tensor of the Cauchy stresses.

The use of the effective "stress" for the calculation of the distribution of the stresses is cited here purely by way of a non-limiting example of the general concept of calculation of the distribution of the stresses.

Once the temporal and spatial distribution of the stresses and the spatial and temporal distribution of the temperature have been calculated, and the distribution of the yield stress is known, it is possible to calculate the spatial and temporal distribution of the fatigue index F. The value of the latter, in the i-th mesh, can be expressed by the following general equation:

$$F = f(\sigma(t), R_{p0.2}(T))$$

where $\sigma$ is the effective stress in the i-th mesh element, said effective stress being dependent on the time t and $R_{p0.2}$ is the yield stress in the i-th mesh element, said yield stress being dependent on the temperature T, said temperature being in turn dependent on the time t (T=g(t)).

In order to calculate the fatigue index it is possible, in particular, to apply any known formula, such as, for example, those indicated in the SAE J1099 standard ("Technical Report on Low Cycle Fatigue Properties", J1099, Society of Automotive Engineers, Warrendale, PA, 1998).

More particularly, in a first embodiment of the present invention, the spatial distribution of a first fatigue index, which has the feature of being higher the smaller the fatigue stress, or of a second fatigue index, which has the feature of being higher the greater the fatigue stress, can be obtained via the following steps:

integrating in time the spatial and temporal distribution of the temperature, in a time interval corresponding to the duration of a die casting cycle, so as to obtain a spatial distribution of the temperature;

integrating in time the spatial and temporal distribution of the stresses, in a time interval corresponding to the duration of a die casting cycle, so as to obtain a spatial distribution of the stresses;

calculating a spatial distribution of the yield stress, said yield stress being dependent on the spatial distribution of temperature; and calculating the spatial distribution of the first fatigue index or of the second fatigue index on the basis of the spatial distribution of the stresses and of the spatial distribution of the yield stress.

In a second embodiment of the present invention, the spatial distribution of a first or of a second fatigue index, instead, can be obtained via the following steps:

calculating a spatial and temporal distribution of the yield stress, said yield stress being dependent on the spatial and temporal distribution of temperature;

calculating the spatial and temporal distribution of the first fatigue index on the basis of the spatial and temporal distribution of stresses and of the spatial and temporal distribution of the yield stress; and integrating in time the spatial and temporal distribution of the first fatigue index and of the second fatigue index, so as to obtain a spatial distribution, respectively, of the first fatigue index or of the second fatigue index.

Once the spatial distribution of the first fatigue index has been obtained, a threshold is applied so as to highlight those areas where this index is above this threshold. More particularly this threshold is defined so as to be comprised between ⅙ of the maximum value taken on by the spatial distribution of the fatigue index and ¼ of said maximum value.

Once the spatial distribution of the second fatigue index has been obtained, a threshold is applied so as to highlight those areas where this index is below this threshold. More particularly, this threshold is defined so as to be comprised between a first value equal to four times the maximum value of the distribution of the second fatigue index and a second value equal to six times the maximum value of the distribution of the second fatigue index.

An object of the present invention is also a die for the production of parts by means of die casting, obtained with the method described above. More particularly the present invention relates to a die comprising a plurality of sub-inserts (2, 3, 4), assembled with attachment means and bordered by boundary lines (5, 6, 7, 8). These boundary lines (5, 6, 7, 8) being located at least partially in the zones where an index of quantification of the thermo mechanical fatigue is greater than a threshold comprised between ⅙ of the maximum value of a spatial distribution of the fatigue index in the die and ¼ of said maximum value if said index is higher the smaller the fatigue stress, or than a threshold comprised between four times the maximum value of a spatial distribution of the fatigue index in the die and six times said maximum value if said index is higher the greater the fatigue stress, said fatigue being that whereto the die is subject if said die were a single piece. The attachment means by means of which the sub-inserts (2, 3, 4) are assembled can be any means of the prior art, such as for example screws and dowels. The die (1) of the present invention can be, moreover, constructed so that the sub-inserts (2, 3, 4) which compose it are of different materials of greater and lesser fatigue stress according to the fact that said sub-inserts are located, respectively, in zones characterised by greater or lesser fatigue index. Therefore, in the die (1) of the present invention, the material of at least one of the sub-inserts (2, 3, 4) can be different from the material of the other sub-inserts (2, 3, 4), the material of said at least one of the sub-inserts (2, 3, 4) having a greater fatigue stress than the materials of said other sub-inserts (2, 3, 4).

Example

The example described here relates to a simulation performed on a die for die casting of a steering house. This die was used really as a whole die. It has a theoretical useful life cycle which on average is equal to 150,000 cycles of die casting and, in the specific case, has begun to show signs of deterioration through fatigue (FIG. 2a) after approximately 12,000 cycles of die casting.

The simulation was performed in the following way:
the geometry of the whole die and of the heat-regulation channels present inside the die were modelled;
the two-dimensional meshes for the discretisation of the surface of the die were defined;

after appropriate refining of the two-dimensional meshes at the zones of contact between die and metal used for the die casting, the volume of the die and of the heat-regulation channels was discretised, by means of three-dimensional meshes;

the materials which constitute the die and the materials of the parts to be made by means of die casting were defined;

the mechanical and thermal boundary conditions were defined;

the following thermo mechanical phenomena which involve the die during a die casting cycle were modelled: filling of the die with molten metal, solidification of the metal, cooling of the die (opening of die and extraction of solidified part), spraying of the die and closure of the die.

The calculation of the spatial and temporal distribution of the die for 15 die casting cycles was then carried out, before reaching a stationary condition. In this particular case it was therefore observed that the spatial and temporal distribution of the temperature of the 14-th die casting cycle did not vary more than 2% (supposing the temperature measured in K) with respect to the spatial and temporal distribution of the temperature in the die during the 15-th cycle. Therefore the calculation of the spatial and temporal distribution of the temperature ended at the 15-th cycle. Once the spatial and temporal distribution of the temperature was obtained, the spatial and temporal distribution of the effective stresses was calculated. On the basis of the dependence of the yield stress on the temperature, the spatial and temporal distribution of the yield stress was therefore defined. Calculation of the spatial and temporal distribution of the fatigue index was then carried out starting from the yield stress and the effective stress. This fatigue index, in the specific case, is higher the smaller the fatigue stress.

The result of this calculation, i.e. a map of the spatial distribution of the fatigue index in the die, was filtered with a threshold equal to ⅕ of the maximum value assumed by the spatial distribution of the fatigue index.

Figure 2A:
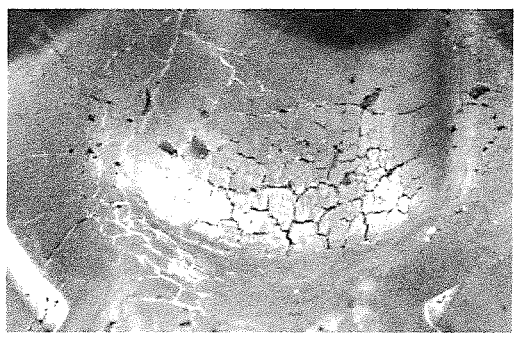
FIG. 2a is a photograph of a die used for testing experimentally the method of the present invention.
Figure 2B:
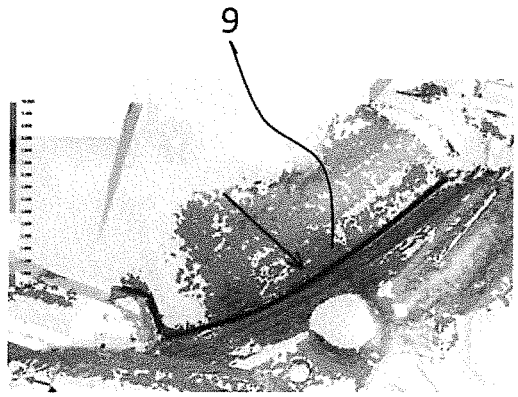
FIG. 2b shows the surface spatial distribution of a thermo mechanical fatigue index, said index being higher the lower the fatigue stress of the die, said distribution being obtained after the simulation of the thermo mechanical behaviour of the die in operation, said behaviour being that to which the die would be subject if said die were in a single piece.
Figure 2C:
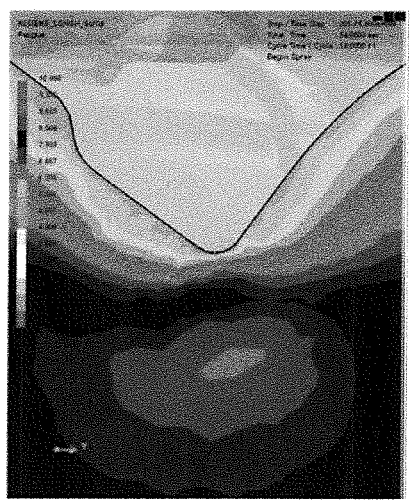
FIG. 2c shows the spatial distribution of the stresses, in the section of a die, said distribution being obtained after the simulation of the thermo mechanical behaviour of the die in operation, said behaviour being that to which the die would be subject if said die were in a single piece.

FIG. 2b shows the spatial distribution of the fatigue index on the die surface after the application of the threshold. Inside the fatigue zones resulting from the filtering the geometric discontinuities of the die were identified and, therefore, the boundary lines of the sub-inserts. More particularly FIG. 2b shows one of these boundary lines (9). FIG. 2c instead shows the spatial distribution of the stresses in a section of the die modelled as whole, obtained by integrating in time the spatial and temporal distribution of stresses, in a time interval corresponding to the duration of a die casting cycle.

Figure 2D:
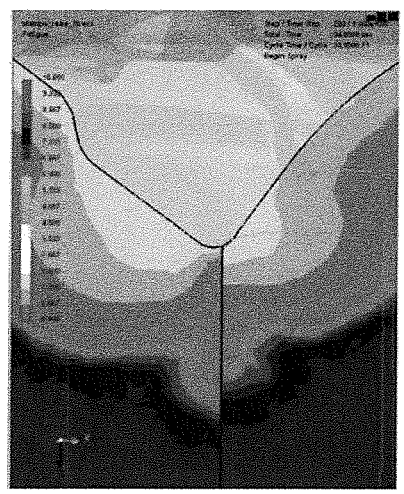
FIG. 2d shows the spatial distribution of the stresses, in the section of a die, said distribution being obtained after the simulation of the thermo mechanical behaviour of the die in operation, said behaviour being that of the die designed according to the present invention, i.e. of the die constructed by assembling a plurality of sub-inserts.

In order to test the improvement in the fatigue resistance of the die, no longer whole, but constructed by means of the assembly of several sub-inserts defined by the boundary lines designed as described above, modelling of the die took place, comprising a plurality of sub-inserts and, then, the simulation of the thermo mechanical behaviour of the latter. The results of this simulation are shown in FIG. 2d which represents the spatial distribution of the effective stress in a section of the die, said die being constructed by assembling a plurality of sub-inserts. Comparing FIGS. 2c and 2d it is possible to highlight how in the fragmented die, i.e. constructed by assembling a plurality of sub-inserts, the stresses are distributed in a more gradual manner, a sign of the greater flexibility introduced, and how, overall, the stresses in the die take on lower values. A more gradual distribution of the stresses, together with a global decrease in the stresses acting in the die, entails an increase in the life of the die. In the specific case the single sub-inserts, defined by the boundary lines designed as described above, were singly produced and subsequently assembled, forming a single die. The useful life cycle of the latter reached 300,000 cycles of die casting, thus doubling the average theoretical useful life cycle of the whole dies and, in the specific case, quadrupling the real duration of the non-fragmented die, intended for the die casting of the same type of component.

The invention claimed is:

1. A method for making dies for die casting, comprising:
designing moulding parts of a mould as a plurality of sub-inserts, each sub-insert of said plurality being bordered by boundary lines;
producing said plurality of sub-inserts; and
assembling the sub-inserts of said plurality with attachment means, so as to form said die; the boundary lines being defined on the basis of a simulation of thermo mechanical behaviour of the die in operation,
wherein said behaviour is the behaviour of the die if said die were a single piece and said simulation is performed by means of a finite element method and comprises
modelling, by means of a processor of a computer, the thermomechanical phenomena whereto the die in operation would be subject if said die were whole;
calculating a spatial distribution of an index of thermo-mechanical fatigue, said index being higher the smaller the fatigue stress and said index being dependent on the value of the stress in a mesh and on the value of the yield stress in a mesh;
identifying on the surface of the die the areas or zones of fatigue, wherein said index is higher than a threshold.

2. The method according to claim 1, wherein the boundary lines are defined by means of:
identifying of the geometric discontinuities of the die;
selecting, among the geometric discontinuities, the discontinuities located in said fatigue zones; and
defining of the boundary lines at said discontinuities.

3. The method according to claim 1, wherein modelling of the thermo mechanical phenomena comprises:
modelling the geometry of the die and of heat-regulation channels present inside the die;
discretising of the surface of the die and of the heat-regulation channels by means of a two-dimensional grid, or mesh;
discretising of the volume of the die and of the heat-regulation channels by means of a three-dimensional grid, or mesh;
defining the materials which constitute the die and the materials of the parts to be made by means of die casting;
defining the mechanical and thermal boundary conditions;
defining the phases of a die casting cycle; and
calculating a first spatial and temporal distribution of the temperature in the die during a first cycle of die casting.

4. The method according to claim 3, wherein modelling of the thermo mechanical phenomena comprises:
calculating a second spatial and temporal distribution of the temperature in the die during a second cycle of die casting;
comparing the first spatial and temporal distribution of the temperature with the second spatial and temporal distribution of the temperature; and
calculating of the spatial and temporal distribution of stresses, if the first spatial and temporal distribution of the temperature does not vary more than 2% (supposing the temperature measured in K) with respect to the second spatial and temporal distribution of the temperature.

5. The method according to claim 4, wherein modelling of the thermo mechanical phenomena comprises:
   calculating of a third spatial and temporal distribution of the temperature in the die, during a third cycle of die casting, if the first spatial and temporal distribution of the temperature does not vary more than 2% with respect to the second spatial and temporal distribution of the temperature.

6. The method according to claim 3, the method comprising:
   refining the two-dimensional grid with which the surface of the die has been discretised, at the zones of contact between die and metal used for the die casting.

7. The method according to claim 3, wherein said die casting cycle comprises:
   solidification of the metal;
   opening of the die;
   extraction of the part;
   air cooling of the die;
   spraying/lubrication of the die;
   blowing;
   closure of the die.

8. The method according to claim 7, wherein said threshold is comprised between a ⅙ of the maximum value of the distribution of the fatigue index and ¼ of said maximum value.

9. The method according to claim 1, wherein calculating of a spatial distribution of the fatigue index comprises:
   integrating in time the spatial and temporal distribution of the temperature, in a time interval corresponding to the duration of a die casting cycle, so as to obtain a spatial distribution of the temperature;
   integrating in time the spatial and temporal distribution of the stresses, in a time interval corresponding to the duration of a die casting cycle, so as to obtain a spatial distribution of the stresses;
   calculating a spatial distribution of the yield stress, said yield stress being dependent on the spatial distribution of temperature; and
   calculating the spatial distribution of the fatigue index, said index being higher the smaller the fatigue stress and said index being dependent on the value of the stress in a mesh and on the value of the yield stress in a mesh.

10. The method according to claim 9, wherein said threshold is comprised between a first value equal to four times the maximum value of the distribution of the fatigue index and a second value equal to six times the maximum value of the distribution of the fatigue index.

11. The method according to claim 1, wherein calculating of a spatial distribution of the fatigue index comprises:
    integrating in time the spatial and temporal distribution of the temperature, in a time interval corresponding to the duration of a die casting cycle, so as to obtain a spatial distribution of the temperature;
    integrating in time the spatial and temporal distribution of the stresses; in a time interval corresponding to the duration of a die casting cycle, so as to obtain a spatial distribution of the stresses;
    calculating a spatial distribution of the yield stress, said yield stress being dependent on the spatial distribution of temperature; and
    calculating the spatial distribution of the fatigue index, said index being higher the greater the fatigue stress and said index being dependent on the value of the stress in a mesh and on the value of the yield stress in a mesh.

12. The method according to claim 1, wherein calculating of a distribution of the fatigue index comprises:
    calculating a spatial and temporal distribution of the yield stress, said yield stress being dependent on the spatial and temporal distribution of temperature;
    calculating the spatial and temporal distribution of the fatigue index, said index being higher the smaller the fatigue stress and said index being dependent on the value of the stress in a mesh and on the value, of the yield stress in a mesh; and
    integrating in time the spatial and temporal distribution of the fatigue index, so as to obtain a spatial distribution of the fatigue index.

13. The method according to claim 1, wherein calculating a distribution of the fatigue index comprises:
    calculating a spatial and temporal distribution of the yield stress, said yield stress being dependent on the spatial and temporal distribution of temperature;
    calculating the spatial and temporal distribution of the fatigue index, said index being higher the greater the fatigue stress and said index being dependent on the value of the stress in a mesh and on the value of the yield stress in a mesh; and
    integrating in time the spatial and temporal distribution of the fatigue index, so as to obtain a spatial distribution of the fatigue index.

14. A method for making dies for die casting, comprising:
    designing moulding parts of a mould as a plurality of sub-inserts, each sub-insert of said plurality being bordered by boundary lines;
    producing said plurality of sub-inserts; and
    assembling the sub-inserts of said plurality with attachment means, so as to form said die; the boundary lines being defined on the basis of a simulation of thermo mechanical behaviour of the die in operation,
    wherein said behaviour is the behaviour of the die if said die were a single piece and said simulation is performed by means of a finite element method and comprises
    modelling, by means of a processor of a computer, the thermomechanical phenomena whereto the die in operation would be subject if said die were whole;
    calculating a spatial distribution of an index of thermomechanical fatigue, said index being higher the greater the fatigue stress and said index being dependent on the value of the stress in a mesh and on the value of the yield stress in a mesh;
    identifying on the surface of the die the areas or zones of fatigue, wherein said index is lower than a threshold.

* * * * *